United States Patent [19]

Floyd

[11] Patent Number: 4,696,771
[45] Date of Patent: Sep. 29, 1987

[54] AMINOPOLYOLS AND POLYURETHANES PREPARED THEREFROM

[75] Inventor: Don E. Floyd, Minneapolis, Minn.

[73] Assignee: Henkel Corporation, Ambler, Pa.

[21] Appl. No.: 805,073

[22] Filed: Dec. 3, 1985

[51] Int. Cl.$^4$ .......................... C11C 3/00; C07C 93/04
[52] U.S. Cl. ................................ 260/404; 260/404.5; 525/418; 564/508
[58] Field of Search .......................... 564/508; 260/404

[56] References Cited

U.S. PATENT DOCUMENTS

| | | | |
|---|---|---|---|
| 2,817,675 | 12/1957 | Hofer et al. | 564/508 |
| 2,819,223 | 1/1958 | De Groote et al. | 564/508 |
| 3,179,697 | 4/1965 | Frump | 564/508 |
| 3,317,505 | 5/1967 | Braus | 564/506 |
| 3,364,239 | 1/1968 | Speranza | 564/508 |
| 3,365,435 | 1/1968 | Adams et al. | 564/506 |
| 3,441,508 | 4/1969 | Drew et al. | 564/508 |
| 3,449,432 | 6/1969 | Borstlap et al. | 564/508 |
| 3,558,711 | 1/1971 | Eckert et al. | 564/508 |
| 4,083,872 | 4/1978 | Schwarze et al. | 564/508 |
| 4,405,811 | 9/1983 | Stogryn et al. | 564/508 |

Primary Examiner—J. E. Evans
Attorney, Agent, or Firm—Ernest G. Szoke; Patrick J. Span

[57] ABSTRACT

Novel aminopolyols are the products of the reaction of an N-substituted ethanolamine with a terminal epoxy-containing compound. The epoxy-containing compounds may be:

I. terminal mono-epoxy-containing aliphatic hydrocarbons,
II. mono-glycidyl ethers of aliphatic hydrocarbons,
III. mono-glycidyl esters of fatty acids, and
IV. di-glycidyl ethers of bisphenols.

The novel aminopolyols are useful in the preparation of novel polyurethanes by reaction with polyisocyanates.

4 Claims, No Drawings

AMINOPOLYOLS AND POLYURETHANES PREPARED THEREFROM

BACKGROUND OF THE INVENTION

1. Field of the Invention

This invention is concerned with novel aminopolyols which are prepared by the reaction of N-substituted ethanolamines with certain terminal epoxy-containing compounds. Further, this invention is concerned with novel polyurethanes which are prepared from these novel aminopolyols by further reaction with organic polyisocyanates. The novel aminopolyols of this invention may be further reacted with lower alkylene oxides to increase chain length or to modify properties for use in the preparation of additional novel polyurethanes.

2. Statement of the Related Art

U.S. Pat. No. 3,065,247 to deGroote, et al. is concerned with the reaction of monohydric alcohol esters of epoxidized fatty acids with polyamino compounds containing a reactive hydroxy group. Specifically, Example 11A shows the reaction of epoxy butyl stearate with hydroxy ethylene diamine and Example 17A shows the reaction of epoxidized methyl ester of soyabean fatty acid with hydroxy ethyl ethylene diamine.

U.S. Pat. No. 4,309,532 to Cuscurida, et al. is directed to modified aminopolyols which are prepared by the reaction of rigid foam polyol initiator having an active hydrogen functionality equal to or greater than four, with one or more alkylene oxides, and amine and an epoxy resin. These modified aminopolyols may then be reacted with organic polyisocyanates to prepare rigid polyurethane foams according to the disclosure in U.S. Pat. No. 4,394,463, also to Cuscurida et al.

U.S. Pat. No. 4,496,487 to Peerman, et al. discloses hydroxymethyl polyols, including certain aminopolyols which may be used in the manufacture of polyurethanes to reaction with organic polyisocyanates.

Polish Pat. No. 100,693 to Wlodyka, et al. Chem Abstracts 91:176154w, shows that reacting diethanolamines with an epoxy compound yielded aminopolyls which were useful for further reaction with organic polyisocyanates for the preparation of polyurethane foams and coatings. Specifically illustrated is the reaction of diethanolamine with Epidian 5, the diglycidyl ether of bisphenol A. Further reaction of this resultant aminopolyol with a polyether, water and a diisocyanate give a polyurethane foam.

SUMMARY OF THE INVENTION

The novel aminopolyols with which the instant invention is concerned are prepared by the reaction of a N-substituted alkanolamine with an epoxy compound selected from the following groups of epoxy compounds:

I. a terminal mono-epoxy containing aliphatic hydrocarbon;
II. a mono-glycidyl ether of an aliphatic hydrocarbon;
III. a mono-glycidyl ester of a fatty acid; and
IV. a di-glycidyl ether of a bisphenol alkylidenes provided said epoxy compound is a mono-epoxy compound when said alkanolamine is a dialkanolamine. In preparing the novel polyurethanes according to this invention, these novel aminopolyols are further reacted with organic polyisocyanates. The novel aminopolyols may optionally further be reacted with lower alkylene oxides in order to increase chain length or modify properties for use in polyurethane manufacture.

DETAILED DESCRIPTION OF THE INVENTION

The preferred N-substituted alkanolamines used in preparing the present novel aminopolyols and the polyurethanes derived therefrom, are the N-substituted ethanol amines according to the general formula:

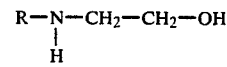

where R is an alkyl group or an hydroxy-alkyl group. Of particular interest in the present invention are N-substituted ethanolamines in which the alkyl portions of the substituents are of up to 3 carbon atoms, that is methyl, ethyl or propyl. Specific examples of N-substituted ethanolamines for use in the present invention are N-methylethanolamine, N-ethylethanolamine, N-propylethanolamine and diethanolamine.

All of the above described ethanolamines are well known compounds which are readily commercially available. For example, suitable N-substituted ethanolamines for use in the present invention are disclosed in U.S. Pat. Nos. 3,872,116; 4,309,532; 4,394,463; and 4,496,487; in German Offen. No. 2,163,143 and 2,516,566; and in Polish Pat. No. 100,693. To the extent necessary to support the disclosure in this specification, the disclosures of these prior patents are incorporated herein by reference.

The epoxy compounds to be reacted with these N-substituted ethanolamines in preparing the aminopolyols and subsequent polyurethanes of this invention are:

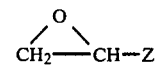

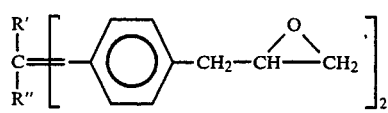

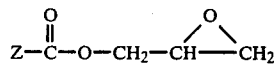

where
Z is an aliphatic hydrocarbon moiety of at least about 8 carbon atoms; and
R' and R" are the same or different alkyl groups.

These epoxy compounds to be used in the present invention are all well known compounds, which, of course, are all readily available commercially. Examples of specific epoxy compounds suitable for use in the present invention are given in U.S. Pat. Nos. 3,065,247; 3,326,946; 4,091,001; 4,309,532 and 4,394,436; in German Offen. No. 2,163,143 and 2,516,566; in Polish Pat. No. 100,693 and in Chemical Abstracts Vol. 91:40289, (1979). The disclosures of all of these references are specifically incorporated herein by reference to the extent that they are necessary to support the disclosure of this invention.

Epoxy compounds which are of particular interest in preparing the aminopolyols and subsequent polyurethanes according to the present invention are 1,2-epoxyhexadecane, glycidyl ethers of mixed fatty alcohols of 12 to 14 carbon atoms, di-glycidyl ethers of Bisphenol A and glycidyl esters of mixed branched chain fatty acids of 9 to 11 carbon atoms. The mono-epoxy containing compounds are preferred.

In preparing the aminopolyols of the present invention, the epoxy compounds as described above are reacted with the N-substituted ethanolamines as described above in essentially stoichiometrically equivalent amounts. A slight excess at most about 10 mole percent of the epoxy compound may desirably be used to ensure complete reaction of the N-substituted ethanolamine with the epoxy compound. Preferably an excess of the epoxy compound if approximately about 5 mole percent may be used. The other reaction conditions of temperature and pressure may be selected by the practitioner of this invention to meet the specifications to be required in the aminopolyol and the resultant polyurethane for a particular use. Generally, suitable pressures will range from about atmospheric to about 50 psig and the temperatures will range from about 0° to about 200° C. The specific examples herein use temperatures of from about 45° to about 120° and normal atmospheric pressures.

As previously mentioned herein, the novel aminopolyols of the present invention are of particular interest for preparing polyurethanes by reaction with organic polyisocyanates. Suitable polyisocyanates for preparing the novel polyurethanes of the present disclosure are all well known in the art, and are disclosed, for example, in U.S. Pat. No. 4,496,487, which is specifically incorporated herein by reference. Of particular interest in preparing the polyurethanes of the present invention are toluene diisocyanates, particularly the 2,4- and 2,6-isomers of toluene diisocyanate, especially a commercially available 80/20 mixture of the 2,4- and 2,6-isomers of toluene diisocyanate and methylene dianiline diisocyanate.

The amount of the polyisocyanate used in forming the urethane compositions of the present invention is expressed on a percentage equivalent weight basis with respect to the hydroxyl functionality of the aminopolyol. Desirably, each hydroxyl functional group on the aminopolyol will react on a 1:1 stoichiometric basis with the isocyanate functionality on the polyisocyanate compound. It is quite possible, however, to form the urethane linkage using from about 80% to about 120%, preferably from about 90% to about 110% on a hydroxylisocyanate equivalent basis of the polyisocyanate to form the polyurethane product. The determination of polyisocyanate required for a given aminopolyol reactant is readily made using hydroxyl or isocyanate equivalent weights as is well known to those skilled in the art. Cross linked polyurethanes are obtained whenever the hydroxyl functionality of the aminopolyol reactant is greater than 2.

To form a urethane reaction product, the aminopolyol of the present invention and the organic polyisocyanate are mixed together in the proper proportions. When utilized as a coating, the compounds are then quickly spread over the surface of the article to be coated as for example with a knife blade, brush or spray. Where molded articles are desired, a variety of techniques may be used, such as casting, injection molding, and reaction injection molding.

Where desired, any of a variety of polyurethane catalysts well known in the art may be employed. Examples of such polyurethane catalysts include those recited in U.S. Pat. No. 4,496,487 to Peerman, et al. The polyurethane catalysts when employed are used in levels typically from about 0.001% to about 5% by weight of the polyurethane components.

Since the aminopolyols of the present invention are liquid, additional heating is necessary only where required to ensure efficient mixing of the reactants. Reaction temperatures for preparation of the polyurethane product may be from about 0° to about 100° C., preferably from about room temperature to about 50° C. Those skilled in the art, will readily recognize that optimum curing conditions can easily be determined without undue experimentation.

Included in the polyurethane reaction mixture may be one or more modifying agents which serve to modify the properties of the resultant polyurethane. Typical modifying agents include lower alkylene oxides which act as chain linked extenders, polyols which act as soft and hard segment contributors, fillers, dyes and plasticizers.

The novel polyurethane prepared from the novel aminopolyols of this invention have special attributes which make it particularly desirable. The present novel aminopolyols and polyurethanes are easily prepared from commercially available starting materials without requiring the expense and difficulty of special reaction conditions or equipment. Polyurethanes, according to the present invention, prepared from the novel aminopolyols which have fatty, i.e. aliphatic hydrocarbon moieties of at least about 8 carbon atoms, and up to about 22 carbon atoms, exhibit good water resistance. Because of the presence of tertiary amino groups in the novel polyols, the reaction of organic polyisocyanates is very rapid. Thus the products of the present invention are of particular importance for reaction injection molding (RIM) applications where the product is reacted within the mold after being furnished to the mixing chamber and then to the mold in a liquid state. The present invention polyurethane intermediates do not require additional heating along the feed lines to an RIM apparatus. This of course results in tremendous savings in energy and equipment costs often necessary to keep polyurethane reactants in a liquid or semi solid state during reaction. Solvents required to maintain reactants in a liquid medium can also thus be eliminated.

The following Examples serve to further illustrate various aspects of the present invention. However, it is to be understood that these Examples are in no way intended to limit the scope of this invention, but are offered only as pure illustrative.

EXAMPLE 1

The reactants were:
N-methyl
ethanolamine: 37.5 g (0.5 mole)
Cardura E Ester: 128.6 g (0.05 mole + 5% molar excess) (glycidyl esters of mixed branched chain $C_9$–$C_{11}$ carboxylic acids, a product of Shell Chemical).

The reactants were combined and stirred and then warmed to about 45° C. There was a sharp exotherm which brought the temperature to about 120° C. The mixture was then allowed to cool to 70° C. and was held at 70°–75° C. for 2 hours. Then it was cooled and discharged from the reaction vessel. The product was a pale yellow liquid with the following physical characteristics:

| Gardner Color | 1-2 |
| --- | --- |
| Gardner-Holdt Viscosity | U |
| Hydroxyl No. | 352.2 |
| Total Amine No. | 165.9 |
| Tertiary Amine No. | 166.0 |
| | Infra-red showed no amide groups present. |

EXAMPLE 2

The reactants were:
Diethanolamine: 31.5 g (0.3 mole)
Cardura E Ester: 77.2 g (0.3 mole + 5% molar excess)

The diethanolamine was charged into a 300 ml., 3-neck reaction vessel and stirred at being held at 85° C. The Cardura E Ester was then added drop wise and the heating was adjusted so that temperature of the reaction mixture was maintained at 80°-90° C. After completion of the addition stirring at 80°-90° C. was continued for 2 more hours. The product was cooled and discharged as an almost colorless liquid with the following characteristics:

| Gardner Color | 1+ |
| --- | --- |
| Gardner-Holdt Viscosity | Z-4 |
| Hydroxyl No. | 485.9 |
| Total Amine No. | 157.2 |
| Tertiary Amine No. | 149.2 |

EXAMPLE 3

The reactants were:
N-methylethanolamine: 37.5 g (0.5 mole)
Cardura E Ester: 128.6 g (0.5 mole + 5% molar excess)

Procedure followed was similar to that of Example 2. The product was a pale yellow liquid with the following physical characteristics:

| Gardner Color | 1-2 |
| --- | --- |
| Gardner-Holdt Viscosity | U |
| Hydroxyl No. | 345.4 |
| Total Amine No. | 166.3 |
| Tertiary Amine No. | 165.6 |

EXAMPLE 4

The reactants were:
N-methylethanolamine: 30.0 g (0.4 mole)
1,2-epoxyhexadecane: 109.6 g (0.4 mole + 5% molar excess)

The procedure followed was similar to that of Example 1. The product was an almost colorless liquid with the following physical characteristics:

| Gardner Color | 1+ |
| --- | --- |
| Gardner-Holdt Viscosity | F-G |
| Hydroxyl No. | 317.9 |
| Total Amine No. | 154.6 |
| Tertiary Amine No. | 152.8 |

Upon standing, the product became semi-solid.

EXAMPLE 5

The reactants were:
N-methylethanolamine: 75 g (1.0 mole)
Epon 828: 199.5 g (1.0 equivalent + 5% molar excess) (diglycidyl ether of Bisphenol A, a commercial of Shell Chemical Co.)

The reactants were combined and stirred at room temperature. A sharp exotherm raised the temperature quickly to over 100° C. It was allowed to cool partially and held at 70°-75° C. for stirring for 2 hours. When cooled, the product was a heavy, gummy, resinous material with a pale yellow color and the following physical characteristics:

Hydroxyl No.: 428.3
Total Amine No.: 209.1

EXAMPLE 6

The reactants were:
N-methyl-ethanolamine: 37.5 g (0.5 mole)
Epoxide 8: 152.2 g (0.5 mole + 5% molar excess) (The glycidyl ether of $C_{12}-C_{14}$ mixed fatty alcohols, a commercial product of Proctor & Gamble.)

The procedure followed was essentially that as described in Example 1. The resultant product was a pale yellow liquid with the following physical characteristics:

| Gardner Color | 1-2 |
| --- | --- |
| Gardner-Holdt Viscosity | F |
| Hydroxyl No. | 309.8 |
| Total Amine No. | 134.1 |
| Tertiary Amine No. | 130.1 |

EXAMPLE 7

The reactants were:
N-ethylethanolamine: 35.6 g (0.4 mole)
1,2-epoxyhexadecane: 109.6 g (0.4 Mole + 5% molar excess)

The procedure followed was essentially that as given in Example 2. The product obtained was a pale yellow liquid with the following physical characteristics:

| Gardner Color | 1+ |
| --- | --- |
| Gardner-Holt Viscosity | D |
| Hydroxyl No. | 327.8 |
| Total Amine No. | 151.0 |
| Tertiary Amine No. | 142.4 |

EXAMPLE 8

Polyurethane polymer products were prepared from representative aminopolyols of the present invention according to the following procedures:

| A. Aminopolyol product of Example 3 | 10 g |
| --- | --- |
| 2,4- and 2,6 isomers of toluene diisocyanate (80/20 mixture) | 5.6 g |
| B. Aminopolyol as prepared in Example 4 | 10 g |
| | 5.2 |
| The diisocyanate used in A above | |

In preparing these polyurethane polymer products, essentially the same reaction conditions and procedures were used in both cases. The reactants were combined quickly and stirred by hand with a glass rod. In a time of 1 minute or less the reaction mixture became hot, gelled and solidified. When cooled, the polymer product from A was a pale yellow hard resinous solid. The product from B was a pale yellow, medium-soft, resinous solid.

EXAMPLE 9

Other polyurethane polymer products were prepared using the same diisocyanate (TDI) employed in Example 8, and the aminopolyols and amounts indicated in Table A below. The degree of exotherm, gel time and hardness after 24 hours is noted.

| Aminopolyol Example | Amount of polyol (grams) | Amount of TDI (grams) | Exotherm | Gel Time (mn) | Hardness |
|---|---|---|---|---|---|
| 1 | 5 | 2.8 | Strong | 1 | Hard |
| 2 | 5 | 2.8 | Strong | 1 | Hard |
| 2 | 4 | 3.0 | Moderate | 2 | Hard |
| 3 | 5 | 2.8 | Strong | 1 | Medium-soft |
| 4 | 5 | 2.6 | Strong | 1 | Hard |
| 6 | 4 | 2.0 | Strong | 1 | Hard |
| 7 | 4 | 2 | Moderate | 2 | Soft |

What is claimed is:

1. An aminopolyol obtained by reacting an N-substituted alkanolamine of the general formula $$R-\underset{\underset{H}{|}}{N}-CH_2-CH_2-OH$$

where R is an alkyl group containing up to 3 carbon atoms with a terminal epoxy compound selected from the group consisting of a glycidyl ether of a fatty alcohol having 12–14 carbon atoms and a glycidyl ester of a branched chain fatty acid having 9–11 carbon atoms.

2. An aminopolyol according to claim 1, wherein the N-substituted ethanolamine is selected from N-methylethanolamine, N-ethylethanolamine, N-propylethanolamine and di-ethanolamine.

3. Aminopolyols obtained by reacting N-methylethanolamine with glycidyl esters of mixed branched chain $C_9$–$C_{11}$ carboxylic acids.

4. Aminopolyols obtained by reacting N-methylethanolamine with the glycidyl ethers of $C_{12}$–$C_{14}$ mixed fatty alcohols.

* * * * *